United States Patent [19]
Bi et al.

[11] Patent Number: 5,958,348
[45] Date of Patent: Sep. 28, 1999

[54] EFFICIENT PRODUCTION OF PARTICLES BY CHEMICAL REACTION

[75] Inventors: Xiangxin Bi, Pleasanton; Nobuyuki Kambe, Menlo Park, both of Calif.

[73] Assignee: NanoGram Corporation, Fremont, Calif.

[21] Appl. No.: 08/808,850

[22] Filed: Feb. 28, 1997

[51] Int. Cl.$^6$ ............................... B01J 19/08; B01J 19/12
[52] U.S. Cl. .................... 422/186.04; 266/168; 266/905; 422/186
[58] Field of Search .................... 422/186.05, 186.04, 422/186; 266/168, 905

[56] References Cited

U.S. PATENT DOCUMENTS

| | | | |
|---|---|---|---|
| 4,065,369 | 12/1977 | Ogawa et al. ........................ | 204/164 |
| 4,468,474 | 8/1984 | Gupta et al. . | |
| 4,536,252 | 8/1985 | McDonald et al. . | |
| 4,548,798 | 10/1985 | Rice . | |
| 4,554,291 | 11/1985 | Gupta et al. . | |
| 4,556,416 | 12/1985 | Kamijo et al. . | |
| 4,558,017 | 12/1985 | Gupta et al. . | |
| 4,659,681 | 4/1987 | Rice et al. . | |
| 4,668,647 | 5/1987 | Rice et al. . | |
| 4,687,753 | 8/1987 | Fiato et al. . | |
| 4,689,129 | 8/1987 | Knudsen . | |
| 4,788,222 | 11/1988 | Rice et al. . | |
| 4,844,736 | 7/1989 | Shimo et al. . | |
| 4,957,884 | 9/1990 | Knudsen et al. . | |
| 5,013,706 | 5/1991 | Schramm et al. . | |
| 5,053,580 | 10/1991 | Schramm et al. . | |
| 5,064,517 | 11/1991 | Shimo . | |
| 5,079,033 | 1/1992 | Schulz et al. ........................ | 427/44 |
| 5,207,878 | 5/1993 | Shimo et al. . | |
| 5,358,695 | 10/1994 | Helble et al. . | |
| 5,770,126 | 6/1998 | Singh et al. ........................ | 264/8 |
| 5,874,684 | 2/1999 | Parker et al. ........................ | 75/288 |

OTHER PUBLICATIONS

Bi et al., J. Mater. Res., vol. 8, No. 7, pp. 1666–1674 (Jul. 1993).
Bi et al., J. Mater. Res., vol. 10, No. 11, pp. 2875–2884 (Nov. 1995).
Buerki et al., Surface and Coatings Technology vol. 47, pp. 22–28 (1991).
Buerki et al., High Temperature Science, vol. 27, pp. 323–335 (1990).
Cannon et al., J. of the American Ceramic Society, vol. 65, No. 7, pp. 324–330 (Jul. 1982).
Curcio et al., Applied Surface Science, 46:225–229 (1990).
Danen et al., SPIE, vol. 458, Applications of Lasers to Industrial Chemistry, pp. 124–130 (1984).
Fantoni et al., SPIE, vol. 1279, Laser–Assisted Processing II, pp. 77–88 (1990).
Flint et al., SPIE, vol. 458, Applications of Lasers to Industrial Chemistry, pp. 108–113 (1984).
Gupta et al., SPIE, vol. 458, Applications of Lasers to Industrial Chemistry, pp. 131–139 (1984).
Haggerty et al., in Laser Induced Chemical Processes, edited by J. J. Steinfeld, pp. 165–241 (1981).
McMillen et al., J. Phys. Chem., 86:709–718 (1982).
Musci et al., J. Mater. Res., vol. 7, No. 10, pp. 2846–2852 (Oct. 1992).

(List continued on next page.)

*Primary Examiner*—Daniel J. Jenkins
*Attorney, Agent, or Firm*—Westman, Champlin & Kelly, P.A.; Peter S. Dardi

[57] ABSTRACT

An apparatus efficiently produces of particles from gas phase chemical reactions induced by a radiation beam. The apparatus includes a reaction chamber and an elongated reactant inlet, where the reaction chamber is configured to conform generally to the elongated shape of the reactant inlet. Shielding gas may be introduced to form a blanket of inert gas on both sides of the reactant stream. A feed back loop may be used to maintain the desired pressure within the reaction chamber.

25 Claims, 6 Drawing Sheets

OTHER PUBLICATIONS

Rice et al., SPIE, vol. 458, Applications of Lasers to Industrial Chemistry, pp. 98–107 (1984).

Rice et al., Spectrochimica Acta., vol. 43A, No. 2, pp. 299–300 (1987).

Gregory P. Smith, SPIE, vol. 458, Applications of Lasers to Industrial Chemistry, pp. 11–16 (1984).

Woodin et al., SPIE, vol. 458, Applications of Lasers to Industrial Chemistry, pp. 28–34 (1984).

Andres et al., J. Mater. Res., vol. 4, No. 3, pp. 704–736 (May/Jun. 1989).

Siegel et al., J. Materials Research, 3:1367–1372 (1988).

Rice et al., Laser–Driven Synthesis of Transition–Metal Carbides, Sulfides, and Oxynitrides, in Laser Chemistry of Organometallics, pp. 273–278 (1993).

Cannon et al., J. of the American Ceramic Society, vol. 65, No. 7, pp. 330–335 (Jul. 1982).

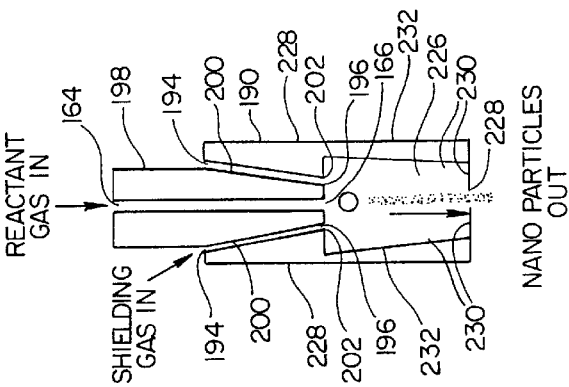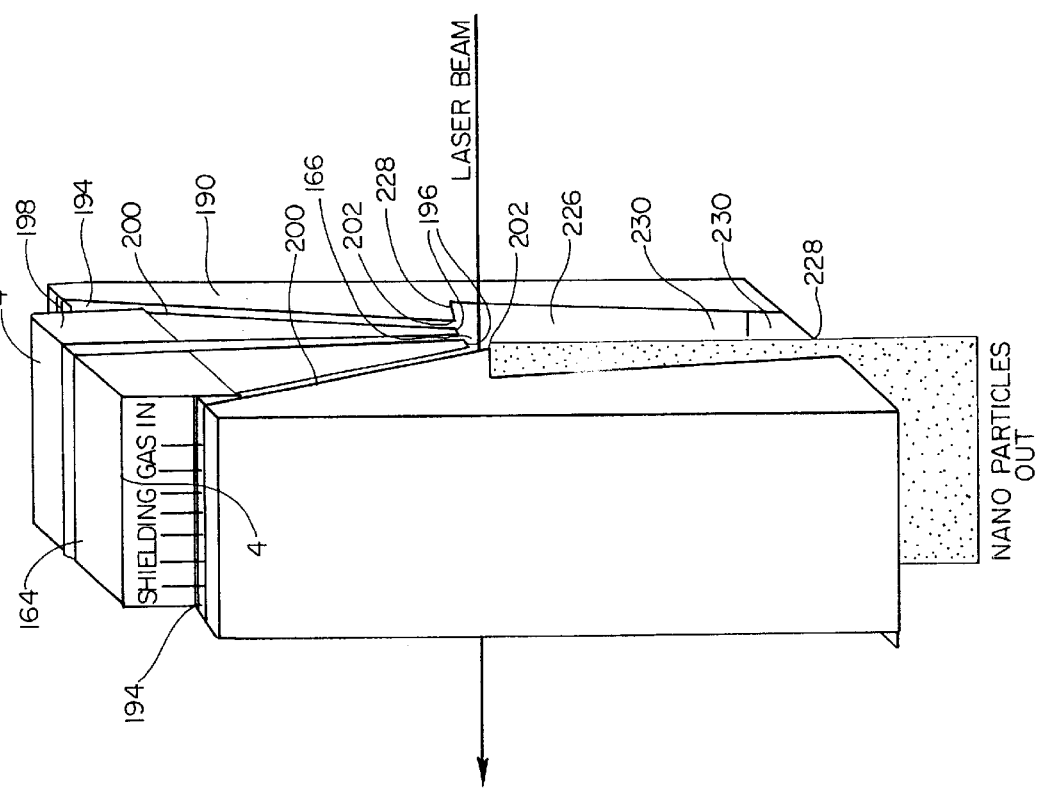

EFFICIENT PRODUCTION OF PARTICLES BY CHEMICAL REACTION

FIELD OF THE INVENTION

The invention relates to producing particles by chemically reacting gaseous reactants.

BACKGROUND OF THE INVENTION

There has been growing demand for solid state materials with dimensions in the range from 1 to 100 nanometers (nm). These nanoscale particles have been found to exhibit unusual chemical, mechanical, electrical, magnetic and optical properties that are different from the corresponding properties of the bulk material and conventional powders. These unusual properties can be exploited in a number of applications.

One advantage of nanoparticles relative to larger particles is the increased surface area for a given weight of material. The surface area per weight of nanoscale particles can be one or two orders of magnitude greater than the surface area per weight of conventional powders. This increase in surface area is desirable for a variety of applications such as those involving catalysis, hydrogen storage and electrical capacitors.

A variety of nanoparticles have been produced using a pyrolytic reaction of chemicals in the gas phase. For example, laser pyrolysis has been used to produce nanoparticles of carbon black, $\alpha$-Fe, $Fe_3C$ and $Fe_7C_3$. These were described in the following two references: Bi, et al., J. Mater. Res. 8:1666–1674 (1993) and Bi, et al., J. Mater. Res. 10:2875–2884 (1995).

SUMMARY OF THE INVENTION

In one aspect, the invention features an apparatus having a reaction chamber and an elongated reactant inlet generally characterized by a major axis and a minor axis for introducing a stream of reactant gas into the reactant chamber. The reaction chamber is configured to conform generally to the shape of the elongated reaction inlet, and to have a beam of radiation projected through it along a radiation path corresponding to the major axis of the elongated reactant inlet and intersecting the reactant stream. Preferably, the apparatus further includes one or more inert gas inlets configured to form a confining stream of inert gas surrounding at least a portion of the reactant stream, and the reaction chamber is configured such that the reactant stream and the confining inert gas stream occupy a significant fraction of the volume of the reaction chamber. The apparatus can further include a laser for producing the beam of radiation.

The apparatus preferably includes a conduit or a pair of conduits for introducing shielding gas into the reaction chamber. If a pair of conduits for introducing shielding gas into the reaction chamber are used, each can be positioned at an angle relative to the elongated reactant inlet such that they define a path intersecting the reactant stream. The conduit for introducing shielding gas preferably terminates along a surface of the reaction chamber.

Preferably, the reaction chamber includes a window for introducing the beam of radiation. The reactant chamber preferably includes a tube, with an inner diameter no more than twice the diameter of the radiation beam, oriented along the radiation path, and a window for introducing the radiation beam into the reaction chamber. This window is located near the end of the tube away from the reactant stream. The reaction chamber can include a pair of windows along the radiation path. Alternatively, the reaction chamber may include a mirror along the radiation path.

In another aspect, the invention features a method for producing particles. The method includes the step of introducing a reactant gas into a reaction chamber in the form of an elongated reactant stream characterized by a major axis and a minor axis. The reaction chamber is configured to conform generally to the shape of the reactant stream. A radiation beam is projected through the reaction chamber along a path along the major axis of the reactant stream, inducing a reaction in the reactant gas to form particles. In a preferred embodiment, the radiation beam includes electromagnetic radiation, which can be generated by a laser. The reactant stream preferably has a generally rectangular cross section.

The invention provides an apparatus for producing particles, where the apparatus makes efficient use of resources at high production capacity without sacrificing quality of the resulting particles. Thus, the apparatus is appropriate for the commercial production of particles, especially nanoparticles with average diameters of 100 nm or less. The commercial production requirements are met for particles that can be produced by the chemical reaction of gaseous reactants.

Other features and advantages of the invention will be apparent from the following description of the preferred embodiments thereof, and from the claims.

BRIEF DESCRIPTION OF THE DRAWINGS

FIG. 3 is fragmentary, perspective view of the cut away illustration of FIG. 2 from a slightly rotated perspective.

FIG. 4 is a sectional view taken along line 4—4 of FIG. 3.

DESCRIPTION OF THE PREFERRED EMBODIMENTS

Figure 1:
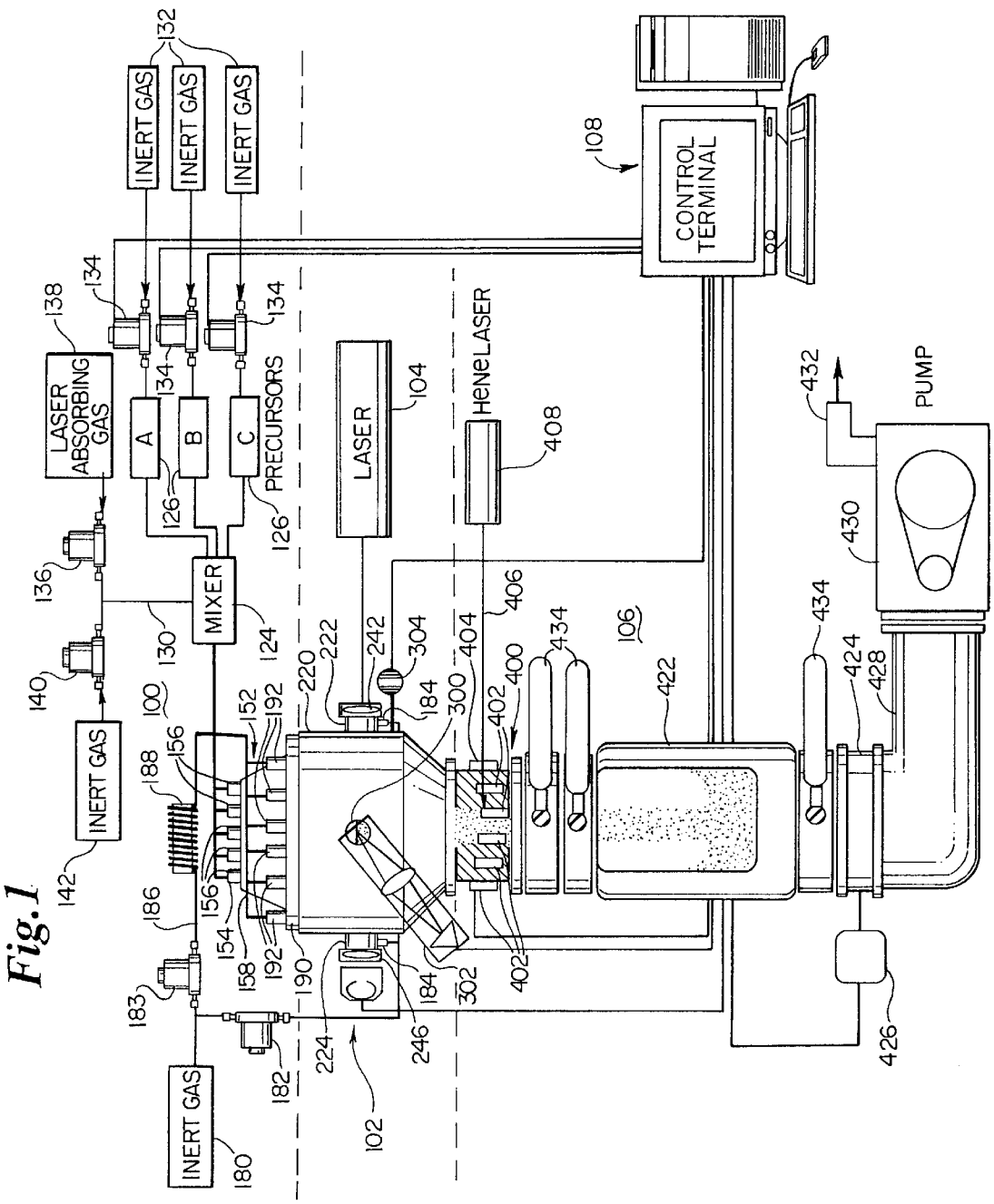
FIG. 1 is a schematic overview of an embodiment of an apparatus of the invention.

The present apparatus is useful for the production of particles, especially nanoparticles, from highly energized chemical reactions. The activation energy for initiation of the reaction is provided by a radiation beam. Typical reactions are pyrolytic in nature in that the energy is transformed into heat, although other reactions may involve nonequilibrium reactions driven by specific interactions with the radiation.

An apparatus for preparing particles, especially nanoparticles, is depicted in FIGS. 1–6. The apparatus includes a gas supply system 100, a reaction chamber 102, an external radiation source 104, a collection system 106, a control computer 108 and a variety of monitoring devices that are described further below. The apparatus described here generally can be used for any radiation-driven chemical reaction, although the precise adjustment of the components may be varied to optimize the reaction parameters for the particular reaction.

Referring to FIG. 1, gas supply system 100 includes a reactant supply system and, preferably, a shielding gas supply system. The reactant supply system preferably includes a mixer 124 to assist with mixing of the reactant gases prior to entering the reaction chamber. Well mixed reactant gases generally will produce a more homogeneous reactant stream, with a corresponding improvement in the quality and quantity of the product particles. Reactant compositions within the "reactant gases" can be in the form of an aerosol, i.e., atomized droplets, that flow similar to a gas in a stream. The mixer 124 can be in the form of manifold into which the reactants are all combined. A variety of other designs can be used to mix the gases.

The mixer 124 is fed by one or more reaction precursor sources 126. FIG. 1 displays three reaction precursor sources 126, but the number of precursors will depend on the specific reaction, with the minimum being one for unimolecular reactions. The number of precursor sources 126 feeding into the mixer 124 can be adjusted according to the number of precursors. The mixer 124, if necessary, can be fed also by a source of radiation absorbing gas 130.

The precursor sources 126 can take a variety of forms depending on the chemical nature of the precursor. If the precursors are gases, the source of the precursors can be an appropriate tank of the compound. Alternatively, the precursor can be, for example, a volatile liquid, possibly heated, where the vapor is used in the reaction; a liquid where an aerosol of the liquid is used; or a solid that is sputtered to form a gaseous or aerosol source of reactant.

An inert gas can be combined with the precursors to assist with their flow. As shown in FIG. 1, a source of the inert gas 132 is directed through a flow controller 134 to the precursor source 126. The inert gas can be connected simply to tubing from the precursor source, bubbled through a liquid containing the precursor, directed to pick up precursor compounds that are being produced in an appropriate form, or directed in any other way to assist with the delivery of the precursor in an appropriate quantity.

In some cases, one or more of the precursors absorb the radiation beam sufficiently such that no additional absorbing gas is required. In other cases, an additional radiation absorbing compound is useful or required, where the radiation absorbing compound transfers the energy to the reactants by collision. Preferred radiation absorbing gases for use with a $CO_2$ laser include $C_2H_4$, $NH_3$ and $SF_6$. Sufficient energy must be absorbed from the radiation beam by the absorbing molecules to carry out the reaction.

The radiation absorbing compound must be generated in a gaseous state if the compound is not already in such a gaseous state. Appropriate techniques to form the radiation absorbing compound in a gaseous state are similar to the techniques described with respect to supplying the precursor compounds.

In FIG. 1, the radiation absorbing gas feed 130 is connected through a flow controller 136 to a radiation absorbing gas supply 138 and, preferably, through a flow controller 140 to an inert gas supply 142. Inert gas can be mixed, if desired, with the radiation absorbing gas to produce a desired concentration of radiation absorbing gas flowing through the radiation absorbing gas feed 130. The precise configuration of the inert gas supply and the radiation absorbing gas supply depends on the desired strategy for mixing the gases.

Gases from the mixer 124 flow to a reactant gas manifold 154 having a plurality of mixed gas inlets 156 connecting to reactant gas conduit 158. Alternative ways can be used to connect mixer 124 with reactant gas conduit 158. Gas delivery system 152 can be heated, if desired, to help to keep certain reactants in gaseous form and to preheat the reactants prior to reaction. Similarly, reaction chamber 102 can be heated along with the gas delivery system 152.

Figure 2:
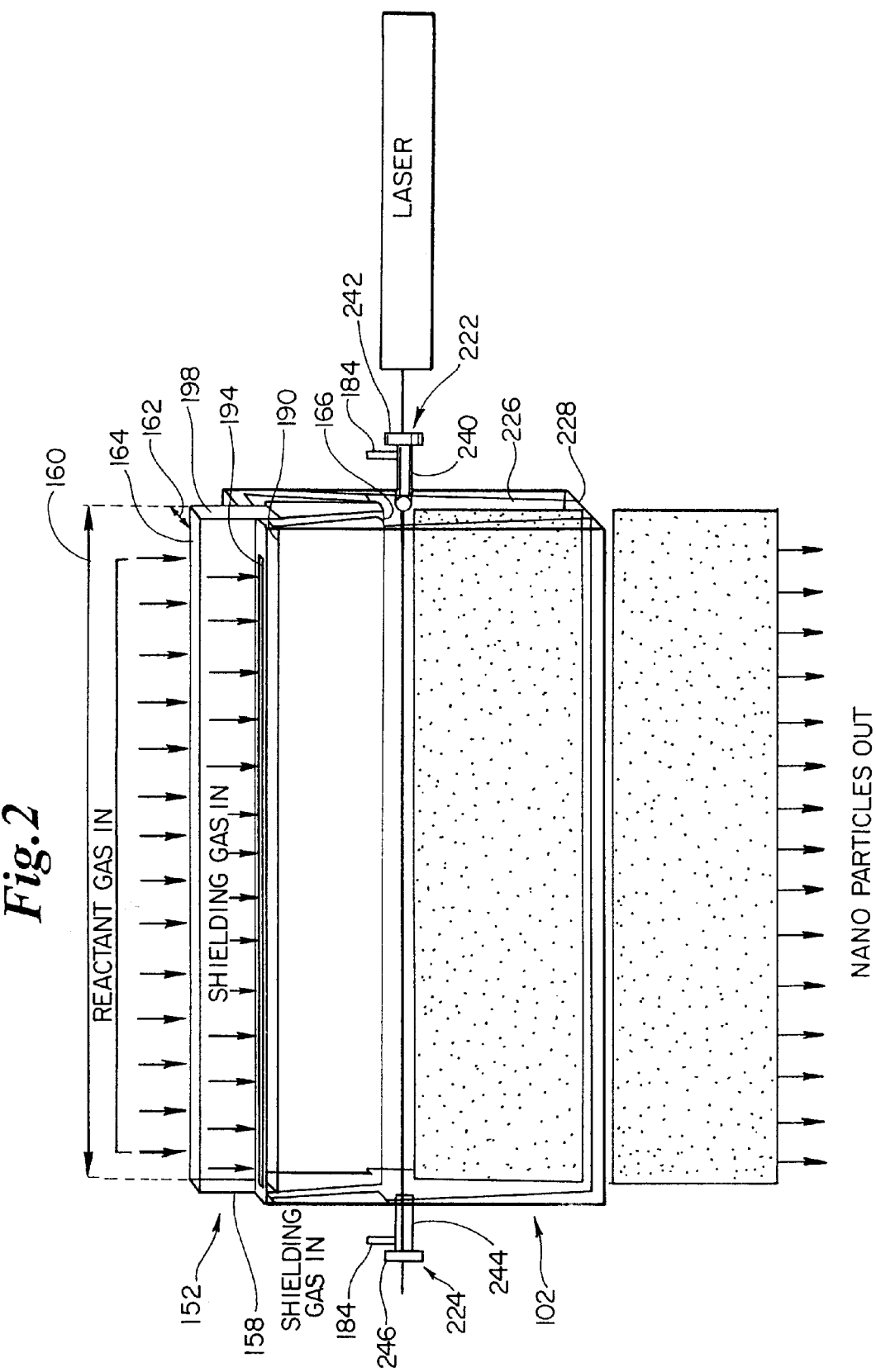
FIG. 2 is a cut away perspective view of the gas delivery system and reaction chamber of the apparatus in FIG. 1.

Referring to FIGS. 2–4, reactant gas conduit 158 within gas delivery system 152 has an elongated length dimension 160 and a width dimension 162 defining a channel 164 within reactant gas conduit 158. These dimensions can be seen in the cut away view of FIG. 2. Preferably, channel 164 has a generally rectangular cross section such as a rectangle, a rectangle with rounded corners, or a rectangular shape with similar minor modifications. Channel 164, however, can have any other shape that is elongated significantly in one dimension of the cross section relative to the orthogonal dimension.

The cross section of channel 164 can vary along the flow path, although the elongated character of the channel should be manifested at the reactant gas inlet 166 leading into reactant chamber 102. Channel 164 can be configured in a variety of ways leading to reactant gas inlet 166. As depicted in FIGS. 1 and 2, channel 164 broadens along the elongated dimension 160 from the connection with mixed gas inlets 156 toward the reaction chamber 102 until reaching a constant value at a preferred elongated dimension and narrows along the width dimension 162 as the channel approaches the reactant gas inlet 166.

Reactant gas inlet 166 preferably has a width such that the width of the resultant reactant gas stream is roughly the width of the radiation beam. In this way, neither radiation nor reactant gas is wasted significantly by being outside of the reaction zone. Alternatively, the reactant gas inlet can be made smaller than the width of the radiation beam. A smaller width results in a higher gas velocity for the same mass flow. A higher velocity generally generates smaller particle sizes, possibly with a different crystalline structure.

The length of the reactant gas inlet 166 is optimally the maximum length over which sufficient energy remains in the radiation beam to support the chemical reaction along the entire length of the reaction zone. Some additional driving force for the reaction occurs due to thermal energy transfer along the reactant stream in the direction of propagation of the radiation beam and in the directions perpendicular to the radiation beam.

Based on a typical reaction using a $CO_2$ laser, the reactant gas inlet generally has a width between about 0.1 mm and about 50 mm, and more preferably between about 0.5 mm and about 30 mm, and a length between about 1 mm and about 2 meters, and more preferably between about 5 mm and about 1 meter. Flow rates for reactant gases depend on the reactant inlet size and gas velocity, which should be selected as appropriate for the desired product particles.

The properties of the product particles, including particle size, crystalline structure and surface properties, vary with reaction conditions. Reaction conditions that influence particle properties include radiation intensity, reaction gas inlet length and width, reaction chamber pressure and reactant gas flow rate. Preferred chamber pressures range from very low vacuum pressures to about 1 atm, and more preferably from about 10 torr to about 500 torr. In general, a smaller reactant inlet opening leads to a higher gas velocity for the same mass flow rate, resulting in a smaller particle size. A higher gas velocity produces a higher mass flow rate of reactants if other parameters are unchanged.

A higher gas velocity also results in a smaller dwell time in the reaction zone and correspondingly less heating with the same radiation energy input. Reaction chamber pressure also affects the dwell time of the reaction gases in the reaction zone. Less heating leads to a crystalline phase that forms under lower temperatures. Higher radiation power increases the reaction temperature, which can lead to the formation of higher temperature phases of the reaction product materials. The size of the reactant inlet influences the quantity of total particle production.

Gas supply system 100 preferably includes a shielding gas supply system. An inert gas, termed a "shielding gas," can be used to confine the flow of the reactant stream and to prevent reactive gases and product particles from striking the chamber walls and sensitive parts of the chamber such as optical components. It is useful to keep particles off of the chamber walls since the particles can result in contamination if the chamber is later used to produce different particles. Sufficient quantities of particles on the chamber wall may also degrade performance generally. Since the apparatus cannot be used while being cleaned, productivity increases if particles are kept off of the surfaces within the reaction chamber 102.

The shielding gas should not absorb significant amounts of energy from the radiation beam. Preferred shielding gases include Ar, He and $N_2$.

Referring to FIG. 1, the shielding gas supply system includes an inert gas store 180, which is preferably connected to a flow controllers 182 and 183. The shielding gas supply system can include a plurality of inert gas stores and/or additional flow controllers. Flow controller 182 preferably is connected to periphery ports 184. Periphery ports 184 supply inert gas into reaction chamber 102 away from the reactant stream so that reactant gases and product particles are kept away from these peripheral areas. The supply of inert gas from the periphery ports 184 can help keep reactant gases and particulate products off of the reactant chamber walls, optics and other components within the reactant chamber 102.

Preferably, flow controller 183 is connected to shielding gas manifold 186. Shielding gas manifold 186 directs the inert gas past a shielding gas heater 188, which heats the inert gas prior to entering the reaction chamber 102. The shielding gas preferably is heated to approximately the same temperature as the reactant gases to prevent cooling of the reactant gas inlet, which can lead to condensation of reaction gases. In addition, heating the shielding gas can reduce the loss of heat from the reaction zone. The shielding gas manifold 186 then directs the gas to a shielding gas conduit 190. Shielding gas manifold 186 can direct the flow of inert gas into shielding gas conduit 190 in a variety of ways. As depicted in FIG. 1, the inert gas flows from shielding gas manifold 186 through a plurality of ports 192 into shielding gas conduit 190.

Referring to FIGS. 2–4, shielding gas conduit 190 preferably features two generally elongated shielding gas channels 194, with one channel 194 being on each side of the reactant gas channel 164. The shielding gas conduit 190 preferably creates a flow of shielding gas into the reaction chamber 102 through elongated shielding gas inlets 196 leading into reaction chamber 102. In the preferred configuration, the shielding gas provides a confining stream of shielding gas in the form of a blanket of shielding gas on either side of the reactant gas stream, which decreases the spreading of the reactant stream and the resulting particles.

Depending on the nature of the reactant gases, it may be desirable to design the channels 194 at an angle to direct the shielding gas toward the reactant stream. Placing the channels 194 at an angle increases the confining character of the shielding gas. For relatively heavy reactant molecules in the reactant stream, the channels 194 can be oriented roughly parallel to the reactant gas channel 164. For relatively light reactant molecules, the shielding gas channels 194 can be oriented at a greater angle relative to the reactant gas channel 164.

As with the reactant gas channel 164, the cross section of the elongated conduits 194 of the shielding gas passageway 190 can have a variety of shapes as long as conduits 194 have an elongated dimension substantially larger than the orthogonal dimension. In a preferred embodiment, shielding gas inlets 196 have a narrow width between about 1 mm and about 20 mm, and more preferably between about 2 to about 10 mm. The gap can be adjusted to increase shielding gas velocity without using an excessive amount of expensive shielding gases such as Ar. The length of the shielding gas inlets preferably is slightly larger than the length of the reactant gas inlet 166.

Alternatively, shielding gas channels 194 can be in fluid communication with each other. For example, at the elongated ends channels 194 may continue and join each other to form a cross section completely encircling the reactant gas channel 164. In another embodiment, the elongated conduits 194 can be replaced by a plurality of smaller conduits with a variety of shapes to produce a flow of inert gas similar to that produced by generally elongated conduits 194.

As depicted in FIGS. 2–4, reactant gas channel 164 is located within a block 198. Facets 200 of block 198 form a portion of conduits 194. Another portion of conduits 194 join at edge 202 with an inner surface of reaction chamber 102. The positioning of block 198 determines the location of reactant inlet 166 within the reactant chamber 102. Block 198 can be repositioned or replaced, depending on the reaction and desired conditions, to vary the relationship between the reactant inlet 166 and shielding gas inlets 196.

In the apparatus, controlled reaction conditions are maintained within a reaction chamber 102, which is closed from the ambient environment. The intersection of the reactant stream and the radiation beam roughly defines the reaction zone, where the reaction is initiated. The products of the reaction form into particulate materials. The exact properties of the particles depend on the reactants and conditions within the reaction chamber. The conditions within the reaction zone should be generally homogenous in order to produce relatively uniform particles, preferably nanoparticles.

The reaction chamber 102 is designed to minimize contamination of the walls of the chamber with particles, increase the production capacity and also to make efficient use of resources. To accomplish these objectives, for example, the chamber 102 conforms generally to the shape of the elongated reactant inlet 166 to decrease dead volume outside of the reactant stream. Gases can accumulate in dead volume increasing the amount of wasted radiation through scattering or absorption by nonreacting molecules. Also, due to the lack of gas flow in the dead volume, particles can accumulate in the dead volume causing chamber contamination.

Referring to FIG. 1, reaction chamber 102 includes a central chamber section 220, radiation source section 222 and radiation termination section 224. Referring to FIGS. 2–4, central chamber section 220 has a cavity 226 where the reaction takes place. Reactant gas inlet 166 and, if applicable, shielding gas inlets 196 open into cavity 226. The cavity includes an outlet 228 along the reactant stream for removal of particulate reaction products, unreacted reactant gases and inert gases.

Cavity 226 is generally elongated to conform with the shape of reactant gas inlet 166. The length of cavity 226 should not extend significantly beyond the ends of the reactant gas inlet 166. Similarly, the width of the cavity 226 should not be excessive given the width of the reactant stream and the blanket of shielding gas surrounding the reactant stream.

Preferably, the volume of the cavity 226 is no more than about 20 times the volume of the reactant stream, more preferably no more than about 10 time and even more preferably between about 2 and about 4 times the volume of the reactant stream. The reactant stream volume is defined by the area of the reactant inlet 166 times the distance from the reactant inlet 166 to outlet 228. The reactant stream and the confining stream of inert gas surrounding the reactant stream together preferably occupy a significant portion of the reactant chamber volume. The reactant stream and confining inert gas stream occupy preferably greater about 50 percent of cavity volume, more preferably greater than about 80 percent and even more preferably greater than about 90 percent. The dead volume, i.e., space where there is no well defined gas flow is correspondingly small.

The exact shape of cavity 226 is not significant as long as cavity 226 has roughly the desired volume and the reactant stream is not obstructed. Preferably, as depicted in FIGS. 3 and 4, the surfaces 230 forming cavity 226 are generally planar for ease of manufacture and to minimize the volume without disrupting the gas flow. Side elongated walls 232 can be angled inward slightly from the edge near reactant inlet 166 going to the edge near outlet 230.

Referring to FIG. 2, radiation source section 222 includes a tubular member 240 opening into cavity 226 oriented along the elongated direction of reactant inlet 166. Preferably, a peripheral port 184 is located on the tubular member 240 to create a positive pressure of inert gas in tubular member 240. The positive pressure of inert gas inhibits displaced reactant gases from flowing into tubular member 240.

The cross section of tubular member 240 can take any shape, although a circular cross section is preferred. The diameter of tubular member 240 should be somewhat larger than the width of the radiation path to be projected along tubular member 240. Tubular member 240 preferably is relatively long and narrow to prevent significant amounts of displaced reactant gases from flowing to the end of the tube. Tubular member 240 preferably extends between 1 cm and 100 cm from cavity 226, and more preferably between about 2 cm and about 5 cm. The desired length of tubular member 240 may be affected by the focus of the radiation beam.

Radiation source section 222 further includes a window 242 at the end of tubular member 240. Window 242 permits the entrance of radiation into the tubular member 240 while the cavity 226 remains isolated from the ambient air. Window 242 can be made of any material which provides for the transmission of radiation into the tubular member 240, so the choice of material depends on the type of radiation. Preferably, if infrared radiation is used, window 242 is made from ZnSe, and it may be shaped into a lens to focus optical radiation as described further below. The lens can be mounted with a vacuum o-ring seal or by fusing the lens directly into the stainless steel flanges. Alternatively, the radiation source can be located within tubular member 240.

Radiation termination section 224 includes a tubular member 244. Generally, an optical element 246 is located at the end of tubular member 244. The design for optical element 246 is selected according to the application.

Optical element 246 can be a mirror to reflect radiation back in cavity 226 or a window to permit transmission of radiation out of tubular member 244. Use of a mirror as optical element 246 provides a higher energy density within the reaction zone since any unabsorbed radiation is reflected back into the reaction zone. Referring to FIG. 1, if optical element 246 is a window, a radiation detector 248 can be placed in the radiation path outside of tubular member 244 to measure the amount of radiation absorbed within the reaction chamber 102. Optical element 246 can be a partly reflective mirror to accomplish part of the functions of both the mirror and the window.

Other optical elements can be placed in the radiation path, as desired. The type of radiation generally suggests the types of materials to use to produce various optical elements.

Figure 5:
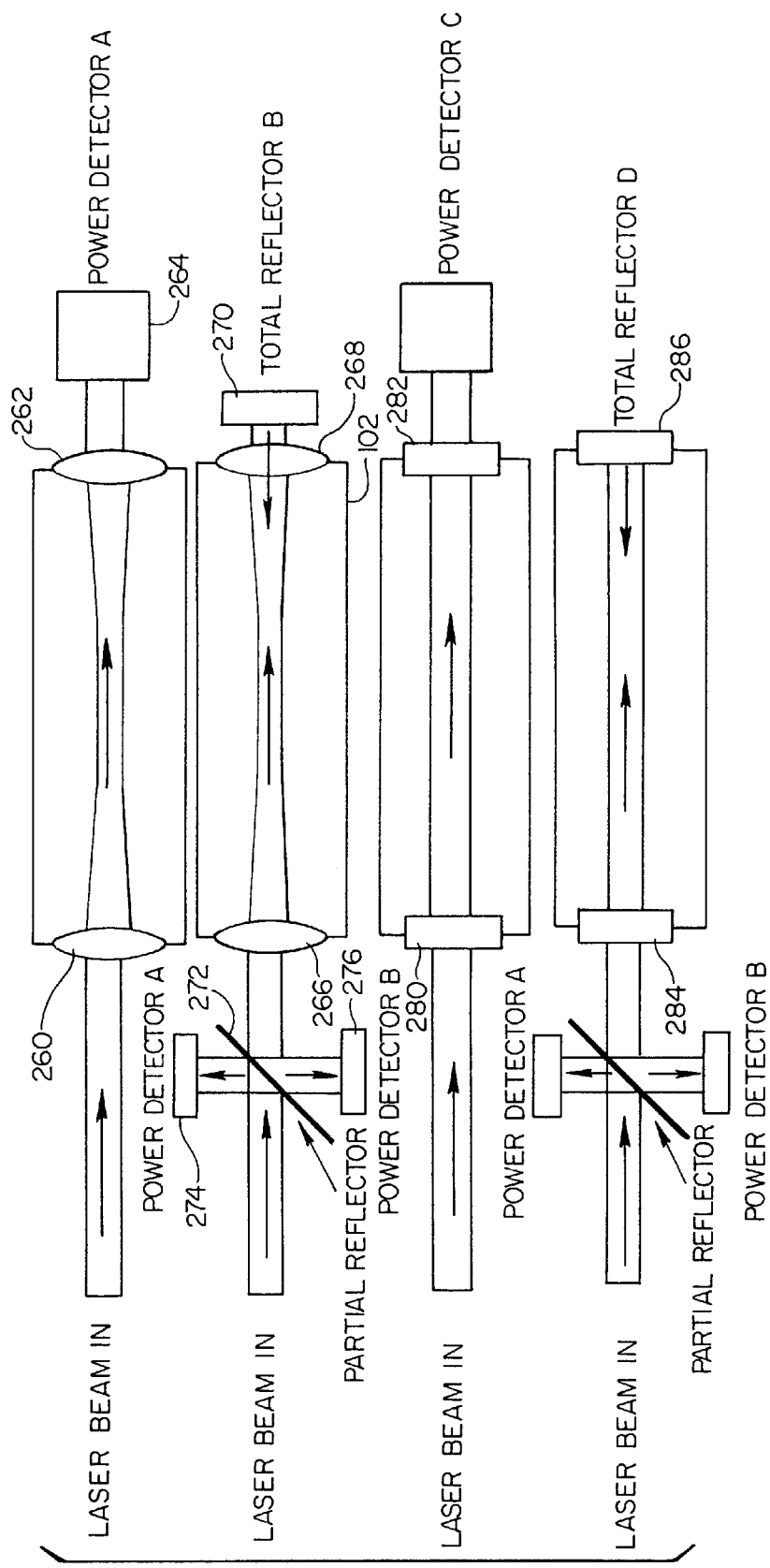
FIG. 5 is a schematic sectional view of four embodiments of optical components appropriate for the apparatus of FIG. 1, where the section is taken along a horizontal plane through the optical path.

Window 242 and optical element 246, along with any other optical components, define the radiation path through the reaction chamber 102. FIG. 5 displays a series of alternative configurations for these optical elements. In embodiment A of FIG. 5, window 242 is a cylindrical lens 260 and optical element 246 is a cylindrical lens 262. Cylindrical lenses focus the light in one plane but not in the orthogonal direction.

Cylindrical lenses 260 and 262 preferably focus the light along the direction of the flow of the reactant gases but not in the direction orthogonal to the flow. The preferred focal length of the lenses is one half of the distance between lens 260 and lens 262 so that the light passing through lens 262 is unfocused collimated light similar to the light striking lens 260. A power detector 264 can be placed in the light path following lens 262, as depicted in embodiment A.

In embodiment B of FIG. 5, two cylindrical lenses 266, 268 are used similarly to lenses 260, 262 of embodiment A. Power detector 264 of embodiment A has been replaced in embodiment B by a mirror 270 to reflect the light back through the reaction chamber 102. A beam splitter 272 can be placed in the beam, preferably in the path from the light source prior to lens 266. Beam splitter 272 is preferably a plate type beam splitter placed at a 45 degree angle to the beam direction.

The beam splitter 272 transmits a portion of the light in roughly the original direction while reflecting a portion of the light at right angles to the propagation direction. The portion of the light transmitted and reflected depends on the materials and coating used to produce the beam splitter 272. Preferably, the beam splitter 272 transmits greater than about 60 percent of the incident light, more preferably greater than about 80 percent of the light and even more preferably greater than about 90 percent of the light.

The portion of the incident light reflected by beam splitter 272 is directed to a power detector 274. Since beam splitter 272 reflects a known portion of incident light, power detector 274 provides a measurement reflecting the incident light intensity. Light reflected by mirror 270 strikes beam splitter 272 propagating in the direction opposite to the incident direction. A portion of reflected light from mirror 270 is reflected by the beam splitter 272 into a second power detector 276. Power detector 276 provides a measurement of the light that was not absorbed or scattered by the gases and particles during the two passes through reaction chamber 102.

Embodiments C and D are comparable to embodiments A and B, respectively, except that flat windows 280, 282 (embodiment C) and 284 (embodiment D) replace cylindrical lenses 260, 262 (embodiment A) and 266 (embodiment B), respectively, and mirror 286 (embodiment D) replaces lens 268 (embodiment B). The power density is lower in the reaction zone if the flat windows are used instead of the cylindrical lenses. This unfocused configuration can be suitable for the synthesis of powders produced at relatively lower temperatures or for higher radiation fluxes where less focusing is needed.

Reaction chamber 102 can include other openings into cavity 226. Referring again to FIG. 1, a window 300 preferably is located along the side of reaction chamber 102 looking into cavity 226. A pyrometer 302 is located outside of this window 300 to monitor the emissions of the reactants, whether black body radiation or chemiluminescence.

Also, a pressure sensor 304 preferably is attached to a small opening in the side of reaction chamber 102. A signal from pressure sensor 304 can be sent to computer 108 for monitoring the pressure in reaction chamber 102. The reaction chamber pressure is measured so that the flow can be adjusted to stabilize the chamber pressure in response to fluctuations and accumulation of particles in the collector system 106.

External radiation source 104 directs a beam of radiation to radiation source section 222. The radiation source can be separate from the reaction chamber, as depicted in FIG. 1. Alternatively, the radiation source can be constructed as an integral portion of the reaction chamber.

A preferred radiation source 104 is a laser that emits radiation at an optical frequency within the infrared, visible or ultraviolet portions of the electromagnetic spectrum where optical components can be used to control the beam. Preferred lasers include infrared lasers, especially high power $CO_2$ lasers. $CO_2$ lasers are available with maximum powers in continuous operation up to 10 KW. For example, an 1800 watt $CO_2$ laser is sold by PRC Corp. of Landing, N.J. It is desirable to have a radiation source that is adjustable over a wide range of powers. In general, different particles are optimally produced at different laser powers.

Alternatively, radiation source 104 can be an nonlaser-optical light source, an electron beam generator, an x-ray source or a comparable radiation source or combination of sources. Some of these radiation sources may have specific requirements with respect to the design of the apparatus to direct the radiation or ultrahigh vacuum conditions to avoid unwanted absorption of the radiation. Regardless of the nature of the radiation, a preferred radiation source 104 should be able to deliver a sufficient amount of absorbable energy in a beam focused within a small reaction zone in the reaction chamber to produce a reasonable flow of product particles.

As noted above, product particles, unreacted reactant gases and inert gas exit the reaction chamber 102 at outlet 228 and enter collection system 106. Collection system 106 has a lower pressure than reaction chamber 102 to provide a flow from reaction chamber 102 into collection system 106. Collection system 106 serves to collect flow from the reaction chamber 102, to isolate reactant particles and to remove the unreacted and inert gases for venting or recycling. The collection system 106 can have a variety of components to achieve these purposes.

The collection system 106 preferably includes a particle size analyzer 400. Real time measurement of particle size permits adjustment of gas flows to generate a desired range of particle sizes. A preferred particle size analyzer 400 includes a plurality of light scattering detectors 402 and a window 404 to provide a light beam 406 to impinge on the particle stream coming from the cavity 226 through outlet 228. A helium-neon laser 408 is a preferred light source for the light scattering measurements, although other comparable light sources can be used. The measurements from the scattering detectors can be used to estimate the distribution of particle sizes.

The particle size analyzer 400 can be interfaced with the computer 108 both to monitor the reaction products and to provide feedback with respect to reaction conditions as the reaction progresses. In this way, laser intensity, chamber pressure and various reactant gas flow rates can be adjusted on a real time basis according to measurements of particle size distribution and degree of agglomeration.

Figure 6:
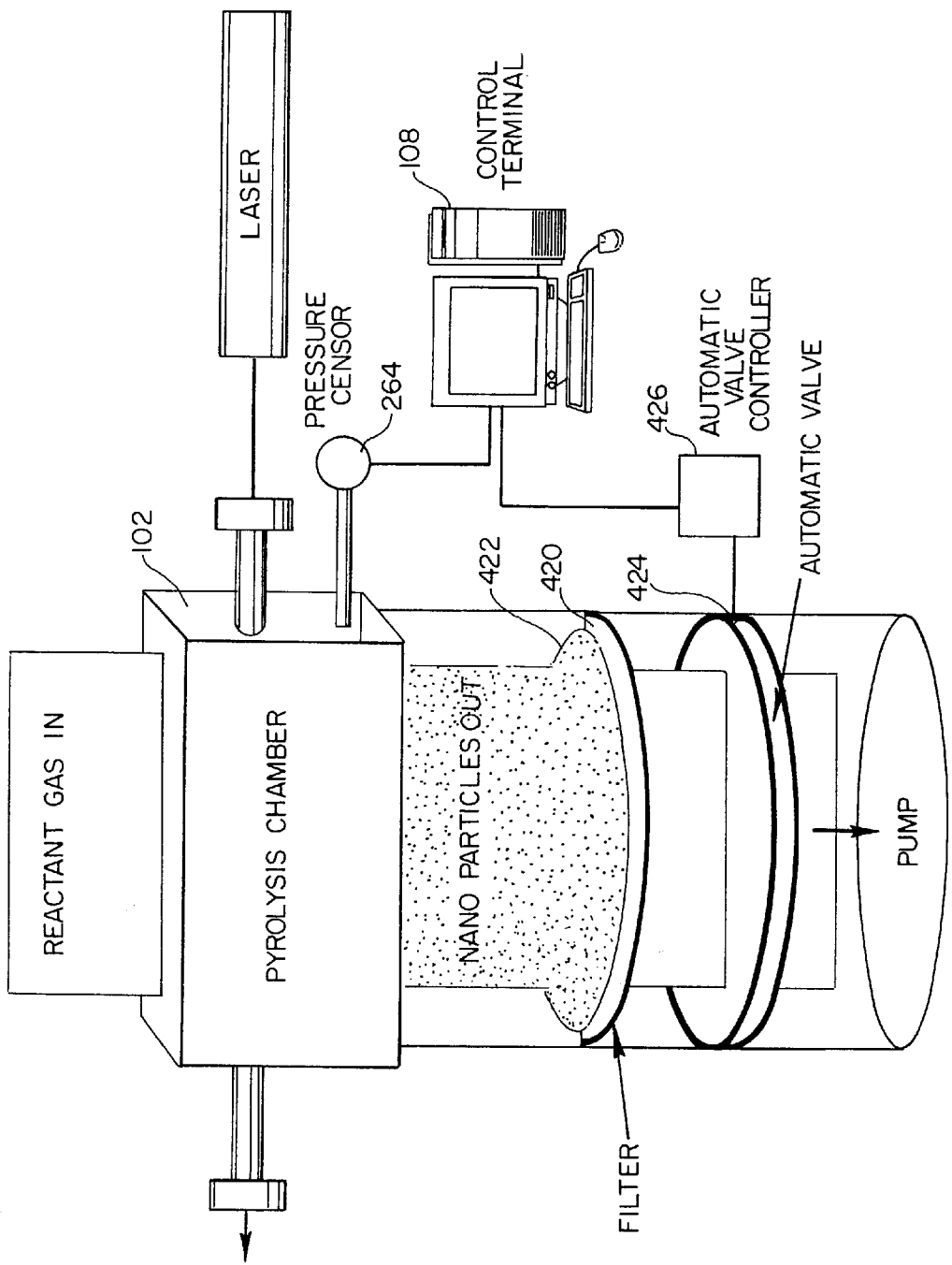
FIG. 6 is a cut away perspective view depicting the collection system of the apparatus of FIG. 1 relative to the reaction chamber and the gas delivery system.

Referring to FIGS. 1 and 6, a filter 420 can be placed in the flow stream following the particle size analyzer 400 to trap the particles within a particle trap 422. Filters can be made from teflon, glass fibers or any material or combination of materials that do not significantly react with the reactant compounds or particulate produces. The pore sizes of the filter material preferably range from about 0.1 micrometer to about 1 micrometer. Commercially available materials can be adapted for use as filter material by conforming it to the correct size for placement in the trap 422. Inert gases and any unreacted gas pass through filter 420 preferably to an automatic valve 424. Automatic valve 424 is interfaced with computer 108 through valve controller 426 to control the flow of gas through collection system 106. Appropriate automatic valves are available, for example, from Edwards Vacuum Products, Wilmington, Mass.

Flow from automatic valve 424 goes to conduit 428 and then to pump 430. Pump 430 has an exhaust 432 for venting the gases or collecting the gases for recycling. Preferred pumps include mechanical pumps capable of handling large volumes of gas without significant loss of pump oil. Appropriate pumps are sold, for example, by Busch Inc., Virginia Beach, Va. Collection system 106 can include a plurality of manual or automatic valves 434 for isolating various parts of the collection system 106.

Accumulation of product particles on filter 420 can decrease the pumping speed of the system. A decrease in the pumping speed would result in an increase in the pressure in the reaction chamber 102. Since particle properties such as size and crystallinity depend sensitively on the chamber pressure, the chamber pressure should be stabilized during synthesis.

As noted above, automatic valve 424 between pump 430 and particle trap 422 can be used to regulate pumping efficiency. The control signal from pressure sensor 264 mounted on reaction chamber 102 is used to control the opening and closing of valve 424 to compensate for pressure changes resulting from the gradual accumulation of powders on particle filter 420. When the maximum opening of the valve is reached, a signal preferably is sent to the computer, which then instructs the system to shut down. Minor pressure fluctuations can also be eliminated or minimized by the pressure-valve, feed-back loop.

Figure 7:
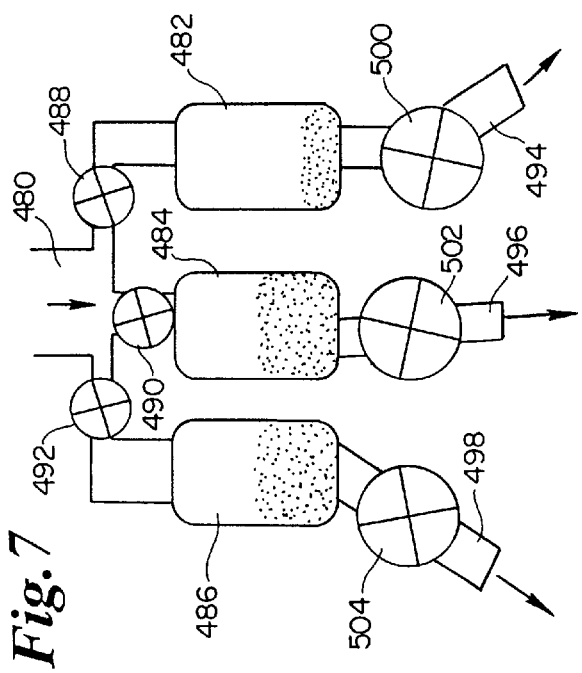
FIG. 7 is a schematic sectional view of a portion of a collection system with multiple particle collectors.

Referring to FIG. 7, in an alternative embodiment, outlet 228 leads to a manifold 480. Manifold 480 connects to three particle collectors 482, 484 and 486. The manifold can be designed to connect to a different number of particle collectors such as two or more than three. Access to the particle collectors 482, 484 and 486 preferably is controlled by automatic valves 488, 490 and 492. Outlets 494, 496 and 498 connect particle collectors 482, 484 and 486 to one or more pumps. Automatic valves 500, 502 and 504 can be used to open and close the connection between the pump or pumps and particle collectors 482, 484, 486. Manual valves can be substituted for one or more of the automatic valves.

Using a plurality of particle collectors, the apparatus can be run continuously. When one particle collector fills such that the chamber pressure cannot be maintained, the system is switched to fill another particle collector. Nanoparticles follow a gas flow, so a manifold can be used without collecting large numbers of particles at bends in the flow path. If desired, more than one particle collector can be open at one time.

A variety of processors can be used for control computer 108. Preferably computer 108 is interfaced by way of I-EEE protocols, although other types of interface protocols can be used.

In order to adapt particle, especially nanoparticle, production to a commercial scale, it is important to use resources efficiently. These resources include the radiation energy. To some extent, the length of the elongated reactant inlet 166 can be adjusted for efficient use of the radiation source. The apparatus, though, typically is used to produce a variety of different particles. Therefore, the optimal length for the reactant inlet 166 for one reaction may not be appropriate for another.

Figure 8:
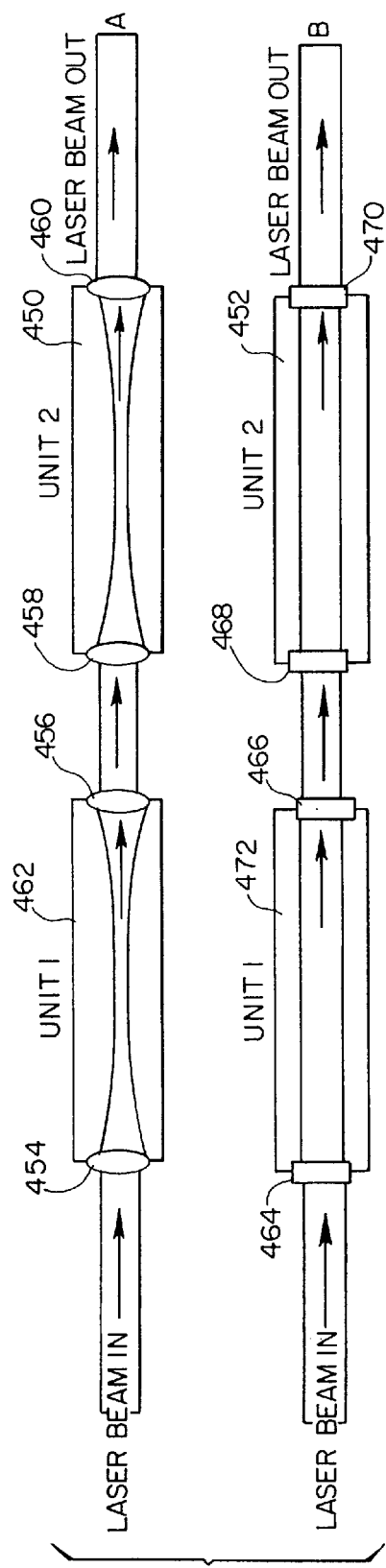
FIG. 8 is schematic sectional view taken along a horizontal plane through the optical path, depicting two embodiments of multiple reaction chambers along a single optical path.

In circumstances where a considerable amount of radiation remains unabsorbed following passage through the reaction chamber, the beam can be directed to a second reaction chamber 450, 452, for example, as depicted in FIG. 8. The different reaction chambers may or may not involve the same chemical reaction.

In embodiment A of FIG. 8, cylindrical lenses 454, 456, 458, 460 are used as windows into and out from first reaction chamber 462 and second reaction chamber 450. In embodiment B of FIG. 8, flat windows 464, 466, 468, 470 provide access for the radiation to first reaction chamber 472 and second reaction chamber 452.

In order to use a pyrolysis chamber as described above, the reactants needed for a desired reaction are selected. Next, it is determined whether a radiation absorbing gas is needed to transfer energy to the reactant molecules. The configuration of the reactant supply system can be adjusted based on the total number and characteristics of the reactants and the presence or absence of a radiation absorbing gas.

Gas flow is initiated at the desired pressures to produce the reactant stream and the shielding gas streams. Simultaneously, the radiation source is initiated and directed to the reaction zone. The product particles exit the reaction chamber and are trapped within the particle collector. Preferably, the reaction conditions are monitored to maintain the pressure within the reaction chamber at desired levels and to ensure the production of desirable sizes of particles.

The reaction can be run until the desired quantity of particles are produced, until the particle collector is full or until the feed-back loop can no longer maintain stable pressure within the reaction chamber. The gas flow into the reaction chamber then can be stopped. If there are appropriate valves, these can be used to isolate the particle collector while maintaining the other parts of the system in isolation from the ambient air. An empty particle collector can then be put in place and the reaction resumed. Alternatively, a switch valve can be included that can direct the product particles to a second particle trap to provide for continuous operation of the system.

Other embodiments are within the following claims.

What is claimed is:

1. An apparatus comprising:
   a) a reaction chamber having a chamber section with a cavity;
   b) an elongated reactant inlet generally characterized by a major axis and a minor axis for introducing a stream of reactant gas into the reaction chamber; and
   c) a particle stream within the cavity,
   the reaction chamber configured to conform generally to the shape of the elongated reactant inlet with a cross section perpendicular to the reactant flow having a major axis oriented in a direction generally corresponding to the major axis of the inlet, and configured to have a beam of radiation projected through the reaction chamber along a radiation path corresponding to the major axis of the elongated reactant inlet and intersecting the reactant stream, wherein the reactant stream and confining inert gas stream occupy greater than about 50 percent of the volume of the cavity.

2. The apparatus of claim 1, further comprising a conduit for introducing shielding gas into the reaction chamber.

3. The apparatus of claim 1, further comprising a pair of conduits for introducing shielding gas into the reaction chamber, each of the conduits being positioned at an angle relative to the elongated reactant inlet such that they define a path intersecting the reactant stream.

4. The apparatus of claim 1, further comprising a conduit for introducing shielding gas, the conduit terminating along a surface of the reaction chamber.

5. The apparatus of claim 1, further comprising one or more inert gas inlets configured to form a confining stream of inert gas surrounding at least a portion of the reactant stream and wherein the reaction chamber is configured such that the reactant stream and the confining stream of inert gas occupy a significant fraction of the volume of the reaction chamber.

6. The apparatus of claim 1, further comprising a pair of elongated conduits for introducing shielding gas into the reaction chamber, each of the conduits being respectively positioned on either side of the elongated reactant inlet to form shielding gas streams confining the reactant stream, wherein the reaction chamber is configured such that the reactant stream and the shielding gas streams occupy a majority of the volume of the reactant chamber.

7. The apparatus of claim 1, herein the reaction chamber comprises a window for introducing the beam of radiation into the reaction chamber.

8. The apparatus of claim 1, wherein the reactant chamber comprises a tube, with an inner diameter no more than twice the width of diameter of the radiation beam, oriented along the radiation path and a window for introducing the radiation beam into the reaction chamber, where the window is located near the end of the tube away from the reactant stream.

9. The apparatus of claim 1, wherein the reaction chamber comprises a pair of windows along the radiation path.

10. The apparatus of claim 1, wherein the reaction chamber further comprises a mirror along the radiation path.

11. The apparatus of claim 1, further comprising a laser for producing the beam of radiation.

12. The apparatus of claim 1 wherein the apparatus further comprises a particle collection system.

13. The apparatus of claim 12 wherein the apparatus can operate in a continuous mode where previously produced particles are removed from the particle collection system while particles are continuously produced.

14. The apparatus of claim 1 wherein the reactant stream and confining inert gas occupy greater than about 80 percent of the volume of the cavity.

15. The apparatus of claim 1 wherein the reactant stream and confining inert gas occupy greater than about 90 percent of the volume of the cavity.

16. An apparatus comprising:
   a) a reaction chamber having a chamber section with a cavity;
   b) an elongated reactant inlet generally characterized by a major axis and a minor axis for introducing a stream of reactant gas into the reaction chamber; and
   c) a particle stream within the cavity,
   the reaction chamber configured to conform generally to the shape of the elongated reactant inlet with a cross section perpendicular to the reactant flow having a major axis oriented in a direction generally corresponding to the major axis of the inlet, and configured to have a beam of radiation projected through the reaction chamber along a radiation path corresponding to the major axis of the elongated reactant inlet and intersecting the reactant stream, wherein the volume of the cavity is no more than about 20 times the volume of the reactant stream.

17. The apparatus of claim 16 wherein the volume of the cavity is no more than about 10 times the volume of the reactant stream.

18. The apparatus of claim 16 wherein the volume of the cavity is between about 2 times and about 4 times the volume of the reactant stream.

19. An apparatus comprising:
   a) a reaction chamber;
   b) an elongated reactant inlet generally characterized by a major axis and a minor axis for introducing a stream of reactant gas into the reaction chamber, the major axis of the reactant inlet corresponding to an elongated dimension of the inlet; and
   c) a cylindrical lens,
   the reaction chamber configured to conform generally to the shape of the elongated reactant inlet with a cross section perpendicular to the reactant flow having a major axis oriented in a direction generally corresponding to the major axis of the inlet, and configured to have a beam of radiation projected through the cylindrical lens and through the reaction chamber along a radiation path corresponding to the major axis of the elongated reactant inlet and intersecting the reactant stream.

20. The apparatus of claim 19 wherein the cylindrical lens focuses the light along the direction of the flow of the reactant stream.

21. The apparatus of claim 19 wherein the reaction chamber further comprises a tube oriented along a radiation path, and wherein the cylindrical lens is mounted on the tube.

22. The apparatus of claim 21 wherein the reaction chamber further comprises a second tube oriented along the radiation path, the second tube comprising a window such that the radiation beam can exit the reaction chamber.

23. The apparatus of claim 21 wherein the tube comprises an inert gas port.

24. An apparatus comprising:
   a) a reaction chamber having a chamber section with a cavity;
   b) an elongated reactant inlet generally characterized by a major axis and a minor axis for introducing a stream of reactant gas into the reaction chamber; and
   c) a particle collection system providing for the continuous operation of the apparatus such that particles can be collected without halting particle production,
   the reaction chamber configured to conform generally to the shape of the elongated reactant inlet with a cross section perpendicular to the reactant flow having a major axis oriented in a direction generally corresponding to the major axis of the inlet, and configured to have a beam of radiation projected through the reaction chamber along a radiation path corresponding to the major axis of the elongated reactant inlet and intersecting the reactant stream.

25. An apparatus comprising:
   a) a reaction chamber having a chamber section with a cavity;
   b) an elongated reactant inlet generally characterized by a major axis and a minor axis for introducing a stream of reactant gas into the reaction chamber; and
   c) a particle collection system,
   the reaction chamber configured to conform generally to the shape of the elongated reactant inlet with a cross section perpendicular to the reactant flow having a major axis oriented in a direction generally corresponding to the major axis of the inlet and to have a beam of radiation projected through the reaction chamber along a radiation path corresponding to the major axis of the elongated reactant inlet and intersecting the reactant stream, wherein the reactant stream and confining inert gas stream occupy greater than about 50 percent of the volume of the cavity.

* * * * *